Patented July 23, 1940

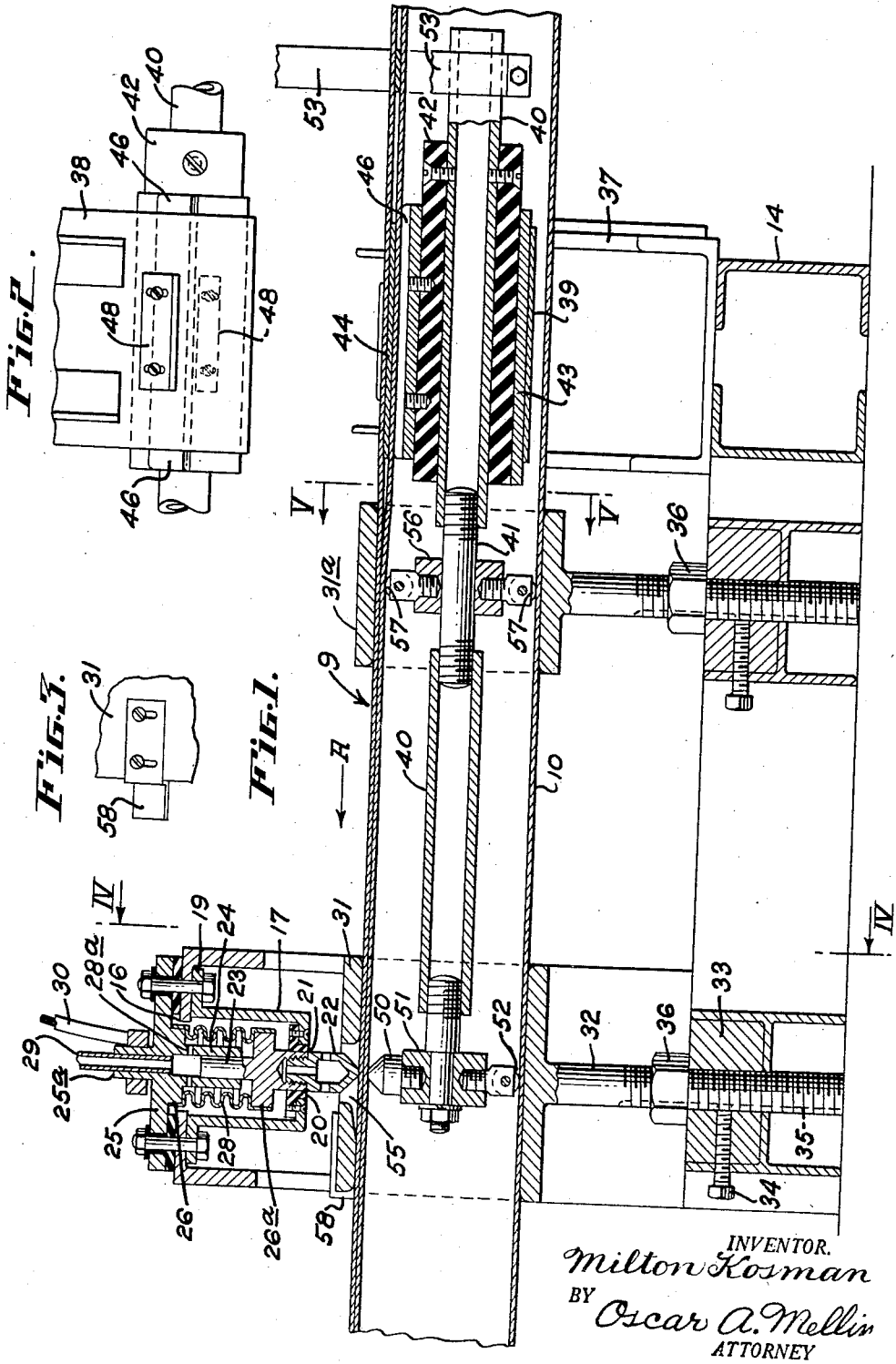

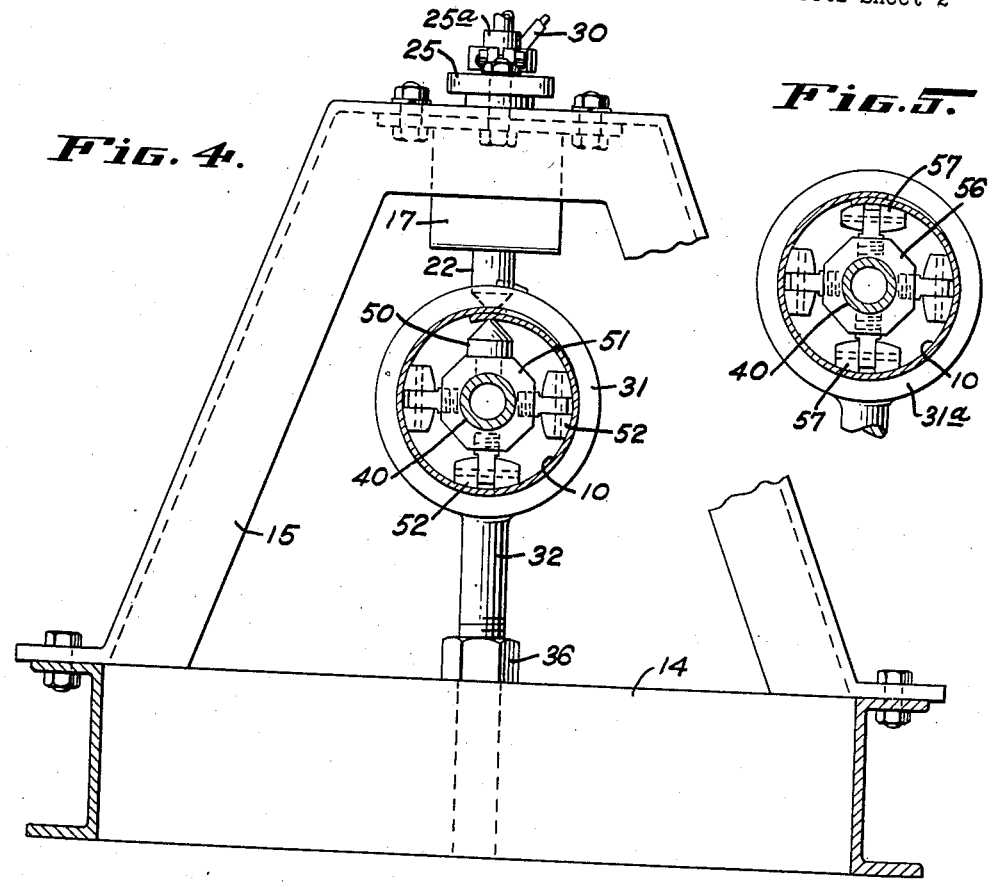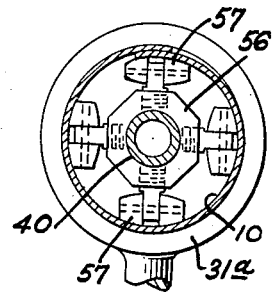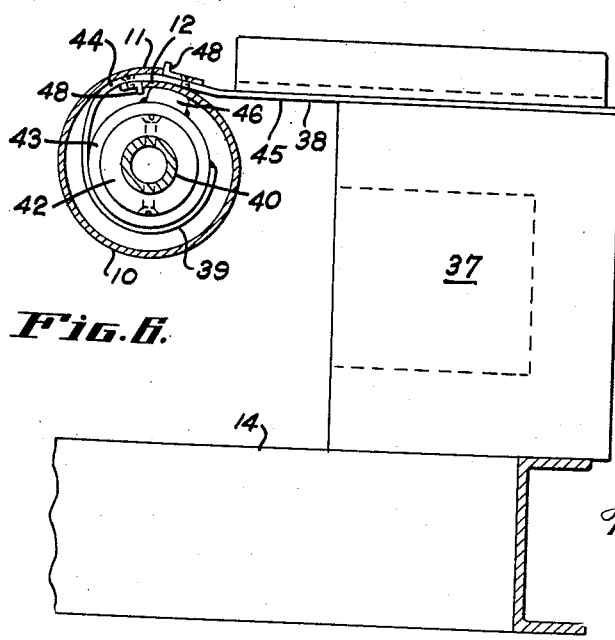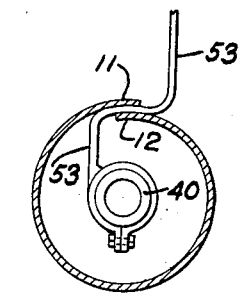

2,208,676

UNITED STATES PATENT OFFICE 2,208,676

PIPE WELDING MACHINE

Milton Kosman, Berkeley, Calif.

Application August 10, 1938, Serial No. 224,042

10 Claims. (Cl. 219—6)

This invention relates to an apparatus for welding the lapped longitudinal edges of tubing.

Prior to my present invention machines have been provided for seam and spot welding of the lapped longitudinal edges of metal tubing. In all of these prior machines it was necessary, in order to support the inner electrode, which is necessarily positioned within the tubing, to spread the lapped seams of the tubing apart to an extent enabling a purely radially positioned supporting member to project into the tubing to support the inner electrode. Consequently, it is obvious that in so spreading the tubing, the tubing would be distorted or deformed to some degree, and usually required some means of reforming the tubing to some degree to return it to its original condition prior to the welding of the edges thereof.

It is the principal object of my present invention to provide a simple and efficient apparatus for welding the overlapping edges of rolled tubing, in which apparatus the inner electrode is supported and the current lead thereto in a manner avoiding the necessity of deforming the tubing to an extent requiring reforming thereof, and in which apparatus the outer electrode is movable toward the work by means of a simple and efficient mechanism enabling it to tightly press the overlapping edges of the tubing together so as to effect an efficient weld.

In actual practice I provide a machine including a frame provided with supports for receiving the tubing to be welded and guiding the same so that the lapped edges will be properly positioned with relation to the electrodes. These electrodes are positioned one stationarily within the tubing to engage the inner face of the lap and the other exteriorly to engage the outer face thereof. The latter may be moved by fluid pressure or other means toward the lap to press the edges tightly together while effecting the weld. The inner electrode is so supported and the current is lead thereto in a manner undistorting the tubing to an appreciable degree, and enabling the same to move freely longitudinally and its lapped edges thereof to be presented between the electrodes for welding.

One form which the invention may assume is exemplified in the following description and illustrated by way of example in the accompanying drawings, in which:

Fig. 1 is a central longitudinal sectional view through an apparatus embodying the preferred form of my invention and showing a tubing being operated upon thereby.

Fig. 2 is a fragmentary view in plan of the outboard bearing for supporting the inner electrode.

Fig. 3 is a fragmentary view in plan of one of the tubing guides disclosing the means of maintaining the lapped edges of the tubing in register with the electrodes.

Fig. 4 is a transverse sectional view taken on line IV—IV of Fig. 1, and looking in the direction of the arrows and showing the disposition of the tubing with relation to the inner electrode.

Fig. 5 is a transverse sectional view taken on line V—V of Fig. 1.

Fig. 6 is a view in end elevation of the outboard bearing supporting the inner electrode and the manner of supporting said bearing from the frame.

Fig. 7 is a fragmentary view showing the manner in which the current conductor of the inner electrode is formed.

Referring more particularly to the accompanying drawings, 9 indicates a machine for spot welding the overlapping edges of rolled tubing. In these drawings the tubing is indicated by the numeral 10 and the overlapping edges thereof are indicated by the numerals 11 and 12, the numeral 11 being the outer overlapping edge and 12 being the inner overlapping edge.

The apparatus itself includes a base 14 so suitably constructed of structural steel, or otherwise, to have the required strength and rigidity. Bolted or otherwise secured to the base is an A frame 15, in this instance shown as formed of channel section with the web thereof outermost. At the top of the frame 15 and centrally thereof is a circular opening 16. Beneath this opening is a rigid U-shaped member 17, the legs of which are formed with out-turned flanges 19 bearing against the inner face of the web of the channel frame 15 at opposite sides of the opening 16. The spacing between the legs of the U-shaped member 17 is slightly greater than the diameter of the opening 16.

The base of the U-shaped member 17 is formed with a circular opening to fixedly receive a guide plate 20 of insulating material having a bore 21 in alignment with the circular opening 16 and adapted to reciprocably receive a cylindrical outer electrode 22. The upper end of the outer electrode 22 is formed with a piston 23 projecting into a cylinder 24 depending from a horizontal plate 25 bridging the opening 16 and bearing on and secured to the outer face of the frame 15, although insulated therefrom.

Both the plate 25 and the outer electrode are formed with aligned annular collars 26 and 26a of the same diameter and to which the opposite ends of a Sylphon tube 28 is fixed by silver soldering, or otherwise, to form a flexible current conducting connection between the plate 25 and the outer electrode 22. The plate 25 and the outer electrode are preferably formed of copper so as to be highly conductive, and as is obvious the Sylphon tube forms a highly satisfactory conducting connection between them.

The plate 25 is formed with a boss 25a into which is fixed one end of tubing 29 led to a suitable source of air under pressure. This boss 25a also constitutes a terminal to which a conductor 30 may be connected as illustrated.

It can be readily seen that by admitting air pressure into the cylinder 24 that the outer electrode 22 (which may be water cooled as in standard practice) will be forcibly projected downwardly toward the work. Upon relieving the pressure, the Sylphon tube 28 will elevate the electrode 22 to normal position. Ports 28a are formed in the walls of the cylinder 24 for obvious reasons.

Disposed within the frame 15 with its axis disposed horizontally and at right angles to the axis of the outer electrode is a cylindrical tube receiving guide 31. This guide is formed with a cylindrical shank 32 projecting through the portion 33 of the base 14. The guide 31 and shank 32 are positioned on the base 14 so that the vertical axis of the shank 32 coincides with the vertical axis of the upper electrode 22. A set screw 34 in the base 14 engages a keyway 35 in the shank to hold it against rotation. A feed nut 36 is provided and is threaded on the shank and engages the base 14 so that the vertical position of the guide 31 may be adjusted by merely turning the nut 36. The internal diameter of the guide 31 is such that it closely coincides with the outer diameter of the tubing to be welded, although permitting axial movement of the tubing therethrough.

At the end of the base 14 opposite the frame 15 is a second frame 37 likewise fixed to the base but at one side thereof. Fixed to the top of this frame 37 is a flat relatively thin outboard bearing supporting plate 38 which extends laterally inward of the base 14 and terminates in a semicircular socket 39 receiving one end of a mandrel 40 and supporting the same coaxially of the guide 31. The mandrel 40 is formed of a longitudinal member 41 of copper or the like, on one end of which is mounted a sleeve 42 of insulating material and which is fixed to the mandrel 40. A metallic sleeve 43 is fixed over the insulating sleeve 42 and is welded or otherwise secured to the socket portion 39 of the plate 38.

From its socket portion 39, the plate extends tangentially a radial distance just short of the external radius of the tubing to be welded, and then is formed with an arcuate portion 44 corresponding with the cross-sectional curvature of the tubing to be welded. The arcuate portion then molds into the straight portion 45 of the plate 38 which lies flatwise and is fixed on the frame 37.

A longitudinal bar 46 is secured to the sleeve 43 and its outer surface is concentric with respect to said sleeve and formed on a radius struck from the center of the sleeve 43, the dimension of the radius being approximately that of the internal radius of the tubing to be welded. It will be seen from the drawings that the bar 46 underlies the arcuate portion 44 of the plate 38 so that one edge of the tubing to be welded will be interposed between the arcuate portion 44 of the plate 38 and the bar 46. The other edge of the tubing will overlie the portion 44.

To maintain the lapped edges of the tubing in a definite relationship both to each other and to the electrodes, guides 48 are provided on the arcuate portion 44 of the bearing plate 38 to engage these lapped edges and maintain them in definite position.

From the foregoing it is manifest that I am able to properly support a mandrel in the tubing to be welded by the construction described without distorting or deforming the tubing to any appreciable degree, or to an extent rendering reforming of the tubing necessary.

The mandrel 40 is the electrical conductor for the inner electrode 50 (which may be water cooled according to standard practice) which projects radially from a block 51 secured at the end of the mandrel 40 opposite the outboard bearing just described. The mandrel is illustrated in this instance as being sectional. Also carried by the block 51 are three sets of rollers 52 formed of insulating material and disposed at 90° apart. These rollers and the inner electrode 50 are positioned so as to engage the inner wall of the tubing to be welded so as to center the mandrel 41 therein and insure proper unyielding engagement of the inner electrode 50 with the inner side of the lap of the tubing being welded, and so as to cause the vertical axis of the inner electrode 50 to be coincident with the vertical axis of the outer electrode 22 and of the shank 32.

To lead current to the mandrel and thence to the inner electrode, I provide a flat conductor member 53, best shown in Fig. 7. This member is clamped on the end of the mandrel 40 adjacent the bearing plate 38 and extends tangentially to a point coinciding somewhat with the inner diameter of the tubing to be welded and then laterally or tangentially of the tubing a sufficient distance to extend between the lapped edges thereof. From this point the flat conductor member 53 may be bent to extend vertically, or otherwise, for connection with the source of current. I prefer that the conductor member 53 be formed of rigid conducting material and provided with a sufficient insulating covering. The cross-section thereof is, of course, of sufficient area.

Mounted on the base between the electrodes and the outboard bearing is a second guide 31a similar to that 31 except that it does not have an opening 55 such as formed in the guide 31 through which the outer electrode may project. The guide 31a is mounted on the base identically in the manner of the guide 31, and its vertical position may be similarly adjusted.

The mandrel 40 is provided with a block 56 disposed centrally within the guide and fitted with four sets of insulating rollers 57 arranged at 90° apart and at a radial position to engage the inner periphery of the tube as illustrated in Fig. 5.

As shown in Figs. 1 and 3, the guide 31 is provided with an adjustable guide member 58 which engages the outer edge of the lap on the tubing after the same has been welded. The purpose of this member is to maintain the alignment of the lap with the electrodes after the unwelded portions of the tubing has advanced to a position disengaging it from the outboard bearing 38 and the guides 48 associated therewith. This enables the welding to be continued along the lap in a straight line to the absolute terminal of the tubing.

The ends of the bores of the guides 31 and 31a are chamfered somewhat to facilitate projection of the end of the tube therein.

In operation of the apparatus, the tube is mounted therein as shown by leading one end thereof over the conductor 53 and the outboard bearing plate 38 by slightly separating the lapped edges thereof to accommodate these members between the laps as shown in Figs. 6 and 7. It is obvious that this will not deform or distort the tube to an extent necessitating reforming of the tube.

The tube moves from right to left as shown by the direction of the arrow in Fig. 1.

When the end of the tube registers with and is interposed between the electrodes, the guiding means specified will have maintained the lapped edges in proper alignment with the electrodes. By admitting air pressure to the cylinder 24, the outer electrode will be forced downwardly, pressing the lapped edges firmly together between it and the inner electrode with the necessary required pressure. The pressure applied is, of course, as illustrated in Fig. 1, directly transferred to the base, as the outer electrode, inner electrode, and shank 32 are positioned on one vertical axis. The electric current is then applied to effect the weld.

After the weld is effected, the air pressure is relieved and the upper electrode is withdrawn by the Sylphon tube 28 and the tubing may be advanced to position for a succeeding weld. It is obvious that any well known type of feed mechanism may be provided to advance the tubing, either automatically or otherwise, in the interval between welds. Likewise, I do not limit myself to spot welding as my invention is equally applicable to seam welding of tubing. Such seam welding may be accomplished by merely substituting a roller electrode for the electrode tip illustrated and removal of the outer electrode mechanism here disclosed, removal of the lower roller and roller arm from any suitable seam welder, then setting my mechanism in place, with roller on my mechanism correctly aligned with the upper roller electrode on the seam welder and properly connected so as to work in conjunction with said seam welding machine.

I do not limit the machine for use with round tubing because by changing the shape of guides 31, and 31a, of the rollers 52, of plate 30, etc., oval, square, rectangular, elliptical, or any shape tubing of constant cross-section may be accommodated without departing from the principle of my invention.

While I have shown the preferred form of my apparatus, it is to be understood that various changes may be made therein by those skilled in the art without departing from the invention as defined in the appended claims.

Having thus described my invention, what I claim and desire to secure by Letters Patent is:

1. In an apparatus of the character described for welding the overlapped edges of tubing, an inner and an outer electrode, means for supporting a tubing relative to said electrodes, and means spaced from said electrodes and adapted to extend substantially tangentially between the lapped edges of the tubing for supporting the inner electrode.

2. In an apparatus of the character described for welding the overlapped edges of tubing, an inner and an outer electrode, means for supporting a tubing relative to said electrodes, a mandrel arranged coaxially within the tubing and carrying said inner electrode, and means for supporting said mandrel, said means being substantially flat and thin and adapted to project substantially tangentially into the tubing between the overlapping edges thereof.

3. In an apparatus of the character described for welding the overlapped edges of tubing, an inner and an outer electrode, means for supporting a tubing relative to said electrodes, a fixed mandrel arranged centrally within a tubing supported in the apparatus, a bearing for said mandrel, a support for said bearing including a member adapted to extend tangentially between the lapped edges of the tubing and rigidly connected to said bearing.

4. In an apparatus of the character described for welding the overlapped edges of tubing, an inner and an outer electrode, means for supporting a tubing to be welded with relation to said electrodes and for guiding said tubing for movement longitudinally therebetween, a mandrel over which the said tubing is to pass, said mandrel being arranged coaxially of the tubing and carrying said inner electrode, and an electrical conductor for said mandrel adapted to project tangentially between the lapped edges of said tubing and thence inwardly and connected to said mandrel.

5. In an apparatus of the character described for welding the overlapped edges of tubing, an inner and an outer electrode, means for supporting a tubing to be welded with relation to said electrodes and for guiding said tubing for movement longitudinally therebetween, a mandrel over which said tubing is to pass, said mandrel being arranged coaxially of the tubing and carrying said inner electrode, and means for supporting said mandrel including a relatively flat member adapted to extend tangentially between the lapped edges of said tubing and thence inwardly and fixed to the mandrel, a conductor for said mandrel adapted to extend tangentially between the lapped edges of said tubing and connected with the mandrel.

6. In an apparatus of the character described for welding the overlapped edges of tubing, an inner and an outer electrode, means for supporting a tubing and guiding the same for movement longitudinally between said electrodes, bearing plates for engaging said overlapping edges and maintaining the same in a definite relative position with respect to said electrodes, a mandrel arranged to be concentrically positioned with the tubing as the latter passes through the machine, said inner electrode being carried by said mandrel, a rigid support for said mandrel, including a flat member adapted to extend radially and then tangentially between said lapped edges and rigidly supported exteriorly of the tubing.

7. In an apparatus of the character described for welding the overlapped edges of tubing, a pair of cylindrical guide members through which a tube to be welded may be projected, a mandrel to be positioned centrally within the tube, said mandrel having sets of rollers arranged radially about the same within said guides to engage the inner surface of said tube, one of said guides having an opening formed therethrough, said mandrel having an inner electrode projecting radially therefrom in register with said opening, an outer electrode arranged exteriorly of said guide in register with said opening and adapted to be projected therethrough into contact with the tubing in alignment with said inner electrode.

8. In an apparatus of the character described for welding the overlapped edges of tubing, a pair of cylindrical guide members through which a tube to be welded may be projected, a mandrel to be positioned centrally within the tube, said mandrel having sets of rollers arranged radially about the same within said guides to engage the inner surface of said tube, one of said guides having an opening formed therethrough, said mandrel having an inner electrode projecting radially therefrom in register with said opening, an outer electrode arranged exteriorly of said guide in register with said opening and adapted to be projected therethrough into contact with the tubing in alignment with said inner electrode, means for rigidly supporting said mandrel including a flat rigid member formed to extend tangentially between the lapped edges of said tubing and then relatively fixed to said mandrel.

9. In an apparatus of the character described for welding the overlapped edges of tubing, a pair of cylindrical guide members through which a tube to be welded may be projected, a mandrel to be positioned centrally within the tube, said mandrel having sets of rollers arranged radially about the same within said guides to engage the inner surface of said tube, one of said guides having an opening formed therethrough, said mandrel having an inner electrode projecting radially therefrom in register with said opening, an outer electrode arranged exteriorly of said guide in register with said opening and adapted to be projected therethrough into contact with the tubing in alignment with said inner electrode, means for rigidly supporting said mandrel including a flat rigid member formed to extend longitudinally between the lapped edges of said tubing and then relatively fixed to said mandrel, and an electrical conductor for conducting current to said mandrel comprising a flat insulated bar having a portion disposed tangentially with respect to the lapped edges of said tubing and adapted to project tangentially between said lapped edges into the tubing and be connected with said mandrel.

10. In an apparatus of the character described for welding the overlapped edges of tubing, a pair of cylindrical guide members through which a tube to be welded may be projected, a mandrel to be positioned centrally within the tube, said mandrel having sets of rollers arranged radially about the same within said guides to engage the inner surface of said tube, one of said guides having an opening formed therethrough, said mandrel having an inner electrode projecting radially therefrom in register with said opening, an outer electrode arranged exteriorly of said guide in register with said opening and adapted to be projected therethrough into contact with the tubing in alignment with said inner electrode, means for rigidly supporting said mandrel including a flat rigid member formed to extend tangentially between the lapped edges of said tubing and then relatively fixed to said mandrel, guide means on said flat rigid member to engage the lapped edges of said tubing and maintain them in a fixed relationship with respect to said electrodes, and an electrical conductor for conducting current to said mandrel comprising a flat insulated bar having a portion disposed tangentially with respect to the lapped edges of said tubing and adapted to project tangentially between said lapped edges into the tubing and be connected with said mandrel.

MILTON KOSMAN.